United States Patent [19]
Kim et al.

[11] Patent Number: 6,091,865
[45] Date of Patent: Jul. 18, 2000

[54] IRREVERSIBLE OPTICAL DEVICE UTILIZING OPTICAL FREQUENCY SHIFT

[75] Inventors: Byoung-Yoon Kim; In-Kag Hwang; Seok-Hyun Yun, all of Taejon-shi, Rep. of Korea

[73] Assignee: Korea Advanced Institute of Science and Technology, Taejon-shi, Rep. of Korea

[21] Appl. No.: 08/935,076

[22] Filed: Sep. 25, 1997

[30] Foreign Application Priority Data

Dec. 5, 1996 [KR] Rep. of Korea ............... 96-62099

[51] Int. Cl.[7] ............................................ G02F 1/225
[52] U.S. Cl. ............................. 385/3; 385/27; 356/349; 359/238
[58] Field of Search ............... 250/201.9; 356/349–351; 385/1–4, 8–10, 15, 27; 359/238, 245, 246, 249, 259

[56] References Cited

U.S. PATENT DOCUMENTS

| | | | |
|---|---|---|---|
| 4,215,936 | 8/1980 | Winocur | 250/201.9 |
| 4,615,582 | 10/1986 | Lefevre et al. | 385/4 |
| 4,802,149 | 1/1989 | Moore | 367/100 |
| 5,040,863 | 8/1991 | Kawakami et al. | 359/484 |
| 5,182,610 | 1/1993 | Shibata | 356/349 |
| 5,757,489 | 5/1998 | Kawakami | 356/349 |

*Primary Examiner*—John D. Lee
*Attorney, Agent, or Firm*—Dilworth & Barrese

[57] ABSTRACT

An irreversible optical device using an optical frequency shift. The invention provides an irreversible phase shifter including frequency shifters. An irreversible interferometer is also provided which includes the irreversible phase shifter. The invention also provides an irreversible interferometer using a twin-mode optical fiber. In addition to the twin-mode optical fiber, this irreversible interferometer includes mode/frequency shifters and LP11 mode strippers. The irreversible interferometer exhibits a light transmissivity varying in accordance with the advancing direction of light, so that it can have the same functions as conventional optical isolators or circulators. In accordance with the invention, it is possible to configure a comb filter by incorporating passive mode couplers to the irreversible interferometer. It is also possible to vary the transmissivity and transmitting direction of light or to shift the comb position of the comb filter from a wavelength range, using electrical signals. Since the irreversible optical device of the invention uses optical fibers, it exhibits a small insertion loss and has features capable of achieving a phase shift or transmissivity modulation of light and a variation in the transmissivity of light depending on the wavelength of the light.

12 Claims, 4 Drawing Sheets

IRREVERSIBLE OPTICAL DEVICE UTILIZING OPTICAL FREQUENCY SHIFT

BACKGROUND OF THE INVENTION

1. Field of the Invention

The present invention relates to an irreversible optical device, and more particularly to an irreversible optical device utilizing an optical frequency shift, which device can carry out a phase shift and transmissivity modulation for light and a variation in the transmissivity of light depending on the wavelength of the light.

2. Description of the Prior Art

"Irreversible" means a variation in the effect which light undergoes, depending on the advancing direction of the light. Irreversible devices are used for optical communications, lasers and sensors to avoid a re-reflection of light and to guide a single-directional operation. Faraday rotors, isolators and circulators are known as representative irreversible devices. Typically, such devices utilize the Faraday effect to cause an irreversible operation.

The Faraday effect is a rotation phenomenon of the polarization plane of a beam of linearly polarized light when it passes through transparent matter such as lead or glass in a direction parallel to the direction of an applied strong magnetic field. The rotation direction of the polarization plane does not depend on the direction of propagated light, but depends on the direction of the magnetic field.

The above-mentioned Faraday devices, which cause an irreversible operation by utilizing the Faraday effect, require strong magnetic flux, a polarizer and a medium having a high magneto-optic constant. Typically, such Faraday devices use no optical fiber as a medium because the optical fiber has a very low magneto-optic constant. Where such Faraday devices are used in an optical fiber system, an insertion loss of several decibels occurs in the process of connecting those Faraday devices to optical fibers of the optical fiber system. In order to provide an optical fiber system involving a low insertion loss, an irreversible device consisting of optical fibers should be used.

In addition, it is difficult for known Faraday devices to perform different operations in accordance with different wavelengths of light and to appropriately modulate its operation in accordance with the wavelength of light.

An example of a conventional Faraday device is disclosed in International Publication No. WO9320475. That is, this patent discloses an irreversible phase shifter which is applied to an interferometer to obtain an irreversible transmissivity of light depending on the wavelength of the light. However, the irreversible phase shifter is constituted by a bulk-type Faraday device while exhibiting a large insertion loss. Moreover, this device can not achieve a modulation of transmissivity.

SUMMARY OF THE INVENTION

Therefore, an object of the invention is to solve the above-mentioned problems involved in the prior art and to provide an optical device, which may be a phase shifter or an interferometer, having an irreversible function by utilizing an optical frequency shift irrespective of the Faraday effect.

In order to accomplish this object, the present invention provides an irreversible phase shifter using frequency shifters. In accordance with the present invention, the irreversible phase shifter is incorporated in an interferometer, so that a unique irreversible device is provided. The irreversible device of the present invention has features capable of achieving a phase shift and transmissivity modulation of light and a variation in the transmissivity of light depending on the wavelength of the light.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

The irreversible device of the present invention includes, as essential constituting elements thereof, a twin-mode optical fiber, a mode coupler, a mode/frequency shifter, an LP11 mode stripper, and a mode filter. The reversible device will now be described in conjunction with the constituting elements thereof.

First, the twin-mode optical fiber will be described.

Although a single-mode optical fiber is adapted to feed light of one spatial mode, it can serve to feed light of two or more spatial modes. An optical fiber, which is adapted to feed light of two spatial modes, is called "a twin-mode optical fiber". The lowest-order LP (Linearly Polarized) mode is an LP01 mode, and the LP mode just higher than the LP01 mode is an LP11 mode.

The mode coupler, which is a passive mode coupler, applies bending to the optical fiber at particular intervals, thereby causing a mode coupling between the LP01 and LP11 mode light beams advancing through the optical fiber.

Figure 1:
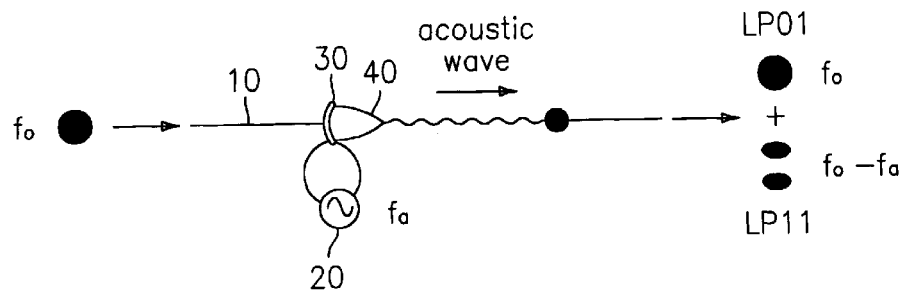
FIG. 1 is a view illustrating a mode/frequency shifter according to the present invention, which is adapted to shift both the frequency and mode of light.

As shown in FIG. 1, the mode/frequency shifter (accurately, the acousto-optic mode/frequency shifter) includes a twin-mode optical fiber 10 for propagating a light beam, a function generator 20 for generating an electrical signal having a particular frequency fa, a piezoelectric transistor (PZT) 30 for generating oscillations (an acoustic wave) based on the electrical signal generated from the function generator 20, and a horn 40 for amplifying weak oscillations generated from the PZT 30 to a maximum. The PZT is a piezoelectric ceramic element. The PZT 30 is activated to generate oscillations (an acoustic wave) when it receives an electrical signal of the particular frequency fa from the function generator 20. The oscillations are transferred to the twin-mode optical fiber 10 via the horn 40 so that they travel along the twin-mode optical fiber 10.

Where the oscillations have the form of a wave as shown in FIG. 1, a mode coupling occurs between the LP01 and LP11 modes as in the passive mode coupler. In this case, however, the frequency, fo, of the light beam varies in addition to a change in the mode of the light beam because the acoustic wave travels along the optical fiber while waving.

When the travel direction of the acoustic wave is the same as the travel direction of the light beam, the LP01 mode is coupled with the LP11 mode in which the light beam has a frequency lower than that in the LP01 mode. In other words, the LP01 mode is partially changed into the LP11 mode, so that the frequency fo of the light beam decreases by the frequency fa of the electrical signal. Simultaneously, the LP11 mode is partially changed into the LP01 mode, so that the frequency fo of the light beam increases by the frequency fa of the electrical signal.

On the other hand, when the travel direction of the acoustic wave is opposite to the travel direction of the light beam, the LP01 mode is coupled with the LP11 mode in which the light beam has a frequency higher than that in the LP01 mode. In other words, the LP01 mode is partially changed into the LP11 mode, so that the frequency fo of the light beam increases by the frequency fa of the electrical signal. Simultaneously, the LP11 mode is partially changed into the LP01 mode, so that the frequency fo of the light beam decreases by the frequency fa of the electrical signal.

The LP11 mode stripper comprises an optical fiber coil having several coil turns of a desired radius. This LP11 mode stripper is adapted to remove most of the LP11 mode without loss of the LP01 mode. Where an optical fiber is bent in the form of a coil having a small radius, a bend loss occurs in light passing through the optical fiber. In this case, the loss of LP11 mode is considerably large, as compared to the loss of LP01 mode. The LP11 mode stripper utilizes this property.

Meanwhile, the LP11 mode may be removed by simply jointing a single-mode optical fiber to the twin-mode optical fiber in such a manner that their centers are aligned with each other.

Figure 2:
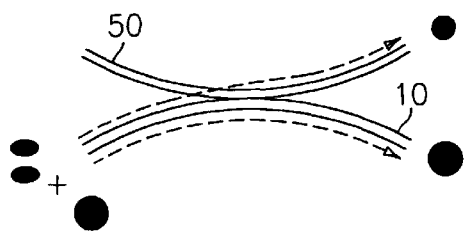
FIG. 2 is a view illustrating a mode filter according to the present invention, which is adapted to split light into LP01 and LP11 mode components.

The mode filter is designed to selectively allow a wave of a particular oscillation mode to pass therethrough while preventing a wave of an oscillation mode other than the particular oscillation mode from passing therethrough or considerably attenuating the latter wave. This mode filter is constituted by a directional coupler including a twin-mode optical fiber 10 and a single-mode optical fiber 50 appropriately selected in association with the twin-mode optical fiber 10, as shown in FIG. 2. This directional coupler is different from a general directional coupler which consists of two single-mode optical fibers. In this mode filter, the LP01 mode component of a light beam entering the twin-mode optical fiber 10 travels continuously along the twin-mode optical fiber 10 whereas the LP11 mode component of the light beam travels along the single-mode optical fiber 50 after emerging from the twin-mode optical fiber 10 at the junction between the optical fibers 10 and 50.

The irreversible device of the present invention including the above-mentioned basic constituting elements will now be described in detail.

First Embodiment

Irreversible Phase Shifter

Figure 3:
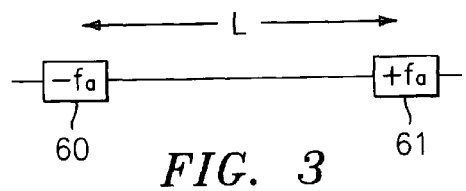
FIG. 3 is a view illustrating an irreversible phase shifter according to the present invention.

Referring to FIG. 3, the basic configuration of an irreversible phase shifter according to a first embodiment of the present invention is illustrated. As shown in FIG. 3, the irreversible phase shifter includes a pair of frequency shifters 60 and 61 respectively arranged at opposite ends of an optical path having a length L and adapted to shift the frequencies of light The frequency shifter 60 serves to decrease the frequency of a light beam passing therethrough by a frequency fa whereas the frequency shifter 61 serves to increase the frequency of a light beam passing therethrough by a frequency fa.

Accordingly, after a light beam advancing from the left to the right and having a frequency fo and a propagation constant 0 passes through the optical path L between the frequency shifters 60 and 61, it has a frequency fo−fa and a propagation constant $\beta_-$. On the contrary, in the case of a light beam advancing from the right to the left and having a frequency fo and a propagation constant $\beta_0$, it has a frequency fo+fa and a propagation constant $\beta_+$ after passing through the optical path L between the frequency shifters 60 and 61. In other words, the light beams respectively advancing to the right and the left are subjected to phase shifts of $\phi_r$ and $\phi_1$ as expressed by the following Equations 1 and 2 while passing through the optical path L:

$$\phi_r = \beta_- L + \delta_a \quad \text{[Equation 1]}$$

$$\phi_1 = \beta_+ L + \delta_a \quad \text{[Equation 2]}$$

Here, "$\delta_a$" represents a phase difference between signals respectively applied to the frequency shifters 60 and 61. In this connection, an irreversible phase difference $\phi_{nr}$ depending on the advancing direction of light can be expressed by the following Equation 3:

$$\phi_{nr} = \phi_r + \phi_1 = (\beta_+ - \beta_-)L \quad \text{[Equation 3]}$$

Accordingly, the irreversible phase difference $\phi_{nr}$ can be set as desired, by adjusting the shift frequencies of the frequency shifters 60 and 61 or adjusting the length of the optical path L.

It is also possible to shift the phases $\phi_r$ and $\phi_1$ of the oppositely advancing light beams without varying the irreversible phase difference $\phi_{nr}$ by varying the phase difference $\phi_a$ of signals respectively applied to the frequency shifters 60 and 61.

Although this embodiment has been described as using two frequency shifters, it is possible to configure an irreversible phase shifter by arranging at least three frequency shifters in parallel or senes.

Second Embodiment

Irreversible Interferometer Using Irreversible Phase Shifter

Figure 4:
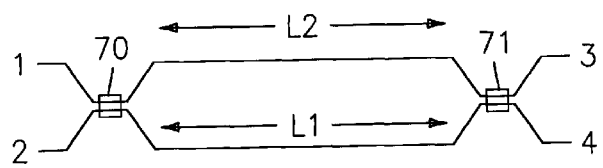
FIG. 4 is a view illustrating a general irreversible interferometer.
Figure 5:
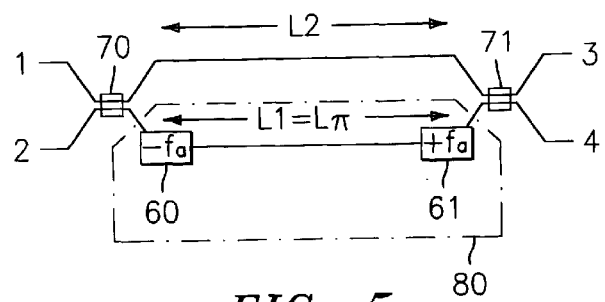
FIG. 5 is a view illustrating an irreversible interferometer using the irreversible phase shifter of FIG. 3.

Referring to FIG. 5, the configuration of an irreversible interferometer according to a second embodiment of the present invention is illustrated, which is incorporated by inserting an irreversible phase shifter according to the first embodiment of the present invention to a general interferometer shown in FIG. 4.

As shown in FIG. 5, the irreversible interferometer includes 2×2 ports, namely, four ports 1 to 4, used as input or output ports, beam splitters 70 and 71 each adapted to split a light beam, and an irreversible phase shifter 80 arranged between the frequency shifters 60 and 61 and provided with an optical path having a length L1 for generating an irreversible phase difference of π (namely, L1=Lπ). The beam splitters 70 and 71 are arranged at opposite ends of an optical path having a length L2.

Where the length of the optical path L2 is appropriately set, a light beam received in the irreversible interferometer at the port 1 causes a reinforced interference at the port 3 whereas a light beam at the port 3 causes an offset interference (a reinforced interference at the port 2). In this irreversible interferometer, light also advances from the port 2 to the port 4 and from the port 4 to the port 1. Accordingly, this irreversible interferometer serves as an optical circulator.

Where the irreversible interferometer uses only the ports 1 and 3, it serves as a general optical isolator.

Figure 6A:
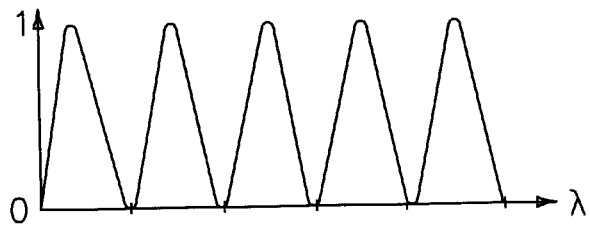
FIGS. 6a and 6b are graphs respectively illustrating a variation in the transmissivity of oppositely advancing light beams in the interferometer depending on the wavelength of the light beams.

When the phase difference $\delta_a$ between the frequency shifters 60 and 61 varies, the phase of light passing through the optical path L1 varies. Accordingly, it is possible to vary the transmissivity in the interferometer.

Where the lengths of the optical paths L1 and L2 are considerably different from each other, the transmissivity in the interferometer depends on the wavelength of light passing through the interferometer. That is, the transmissivity varies in the form of a sine curve in accordance with a variation in wavelength, as shown in FIG. 6a. In this case, the irreversible interferometer serves as a comb filter.

Figure 6B:
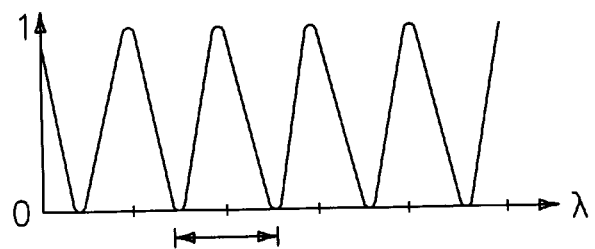

For light advancing in an opposite direction, the irreversible interferometer exhibits a transmissivity varying as shown in FIG. 6b. It can be found that the wavelength of light exhibiting a maximum transmissivity in the case of FIG. 6a exhibits a minimum transmissivity in the case of FIG. 6b. The cycle of the comb filter can be adjusted by varying the length difference between the optical paths L1 and L2.

Third Embodiment

Irreversible Interferometer Using Twin-Mode Optical Fiber

The interferometer of the second embodiment (FIG. 5) may be configured using any optical waveguide. Where the amplitude and efficiency of frequency shift are taken into consideration, it is advantageous to use an integrated optic device. A pair of single-mode optical fibers may also be used, taking loss of light into consideration. In particular, where the interferometer is configured using a twin-mode optical fiber, there is an advantage in that the loss of light is greatly reduced. In this case, it is also possible to simplify the configuration of the interferometer. In this regard, this embodiment provides an irreversible interferometer configured using a twin-mode optical fiber 10, as shown in FIG. 7.

Figure 7:
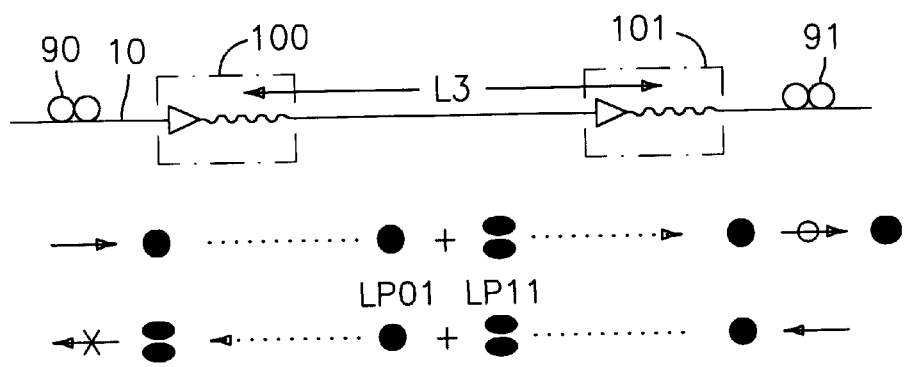
FIG. 7 is a view illustrating an irreversible interferometer according to the present invention, which uses a twin-mode optical fiber.

As shown in FIG. 7, the irreversible interferometer includes a pair of LP11 mode strippers 90 and 91 arranged at opposite ends of the interferometer and adapted to remove an LP11 mode component of light. Each LP11 mode stripper 90 or 91 comprises an optical fiber coil having several coil turns of a desired radius. The irreversible interferometer also includes a pair of mode/frequency shifters 100 and 101 arranged between the LP11 mode strippers 90 and 91 and adapted to vary the frequency and mode of advancing light.

The mode/frequency shifters 100 and 101 are connected to each other by an optical fiber. All the LP11 mode strippers and mode/frequency shifters 90, 91, 100 and 101 are constituted by twin-mode optical fibers 10, respectively. In FIG. 7, the triangular portion 40 in the block indicative of the mode/frequency shifter 100 or 101 is indicative of a horn.

The LP01 and LP11 modes of light travelling through each twin-mode optical fiber 10 serve as the optical paths L1 and L2 in the configuration of FIG. 5, respectively. The mode/frequency shifters 100 and 101 have a mode coupling efficiency of 50%, respectively. Since the mode conversion carried out in each twin-mode optical fiber 10 corresponds to a beam split carried out by the beam splitters 70 and 71, each of the mode/frequency shifters 100 and 101 serves as both a beam splitter and a frequency shifter.

Where the length L3 of the optical fiber between the mode/frequency shifters 100 and 101 corresponds to Lπ, the irreversible interferometer serves as an optical isolator. In the case of a light beam received at the left end of the irreversible interferometer, 50% thereof is converted from the LP01 mode into the LP11 mode by the mode/frequency shifter 100. The LP11 mode component of the light beam is converted again into the LP01 mode by the mode/frequency shifter 101. As a result, 100% of the LP01 mode advances to the right without any loss. That is, a reinforced interference in the LP01 mode is generated.

Similarly, in the case of a light beam received at the right end of the irreversible interferometer, 50% thereof is converted from the LP11 mode to the LP01 mode by the mode/frequency shifter 101. The LP01 mode component of the light beam is converted again into the LP11 mode by the mode/frequency shifter 100. As a result, 100% of the LP11 mode emerges from the mode/frequency shifter 100. This LP11 mode component of the light beam is then completely removed by the LP11 mode stripper 90.

However, when the length L3 of the optical fiber varies even slightly due to a variation in temperature, it is difficult for the interferometer to serve as an optical isolator. In this case, the variation in the length of the optical fiber may be compensated by a phase shift occurring with feedback in the mode/frequency shifters 100 and 101. To this end, the interferometer is incorporated with a circuit for continuously adjusting the phase shifts of the mode/frequency shifters 100 and 101 to obtain a minimum output from the interferometer.

In the case of the interferometer according to this embodiment, it is possible to achieve a transmissivity modulation and an irreversible comb filtering, as in the interferometer of the second embodiment (FIG. 5).

Figure 8A:
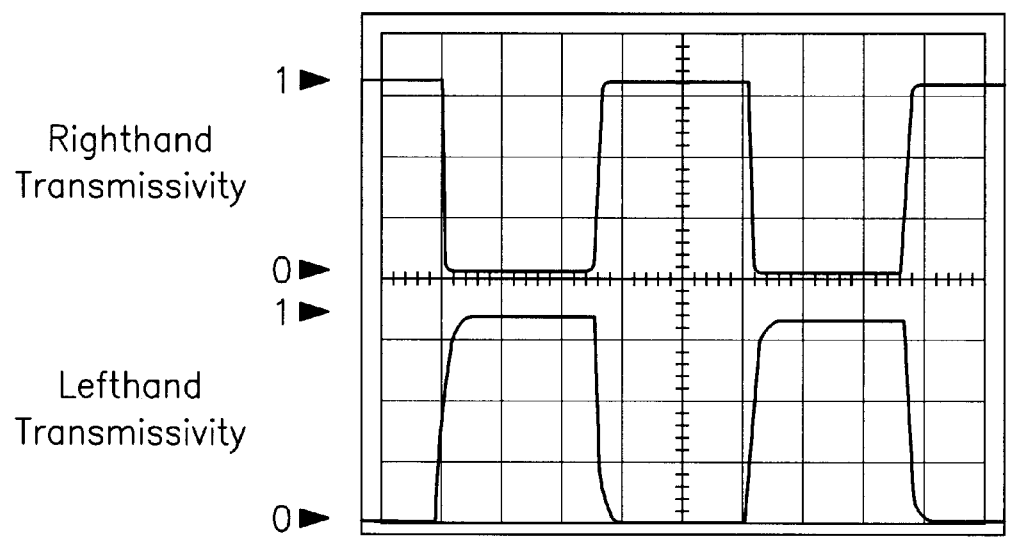
FIGS. 8a and 8b are oscilloscope photographs respectively showing the results obtained when the transmissivity or transmitting direction of light varies in an orthogonal form and a sinusoidal form, respectively.
Figure 8B:
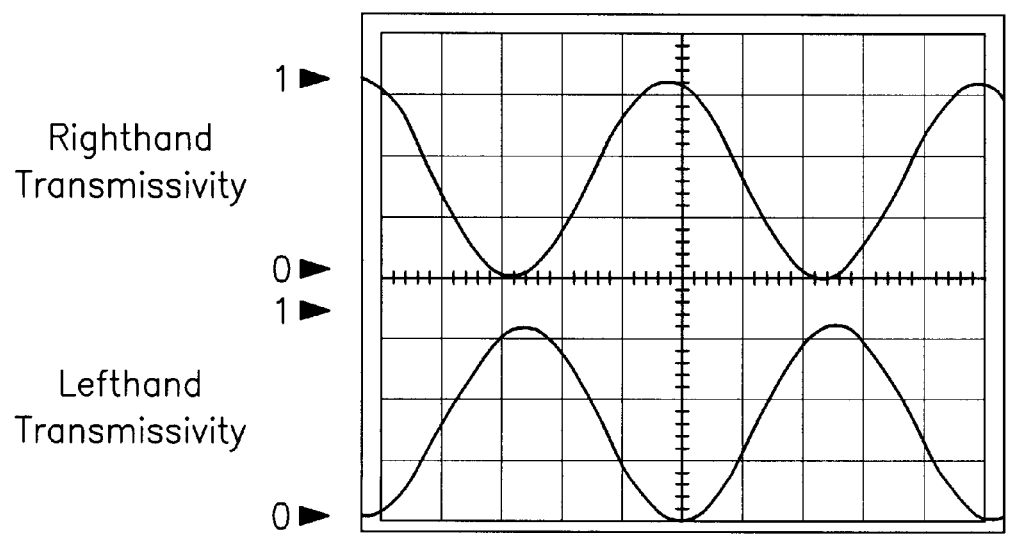

FIG. 8a shows a change in the transmitting direction of light occurring when the phase of an electrical signal applied to the mode/frequency shifter 101 varies alternatingly between "0" and "π". On the other hand, FIG. 8b shows a variation in the transmissivity of light occurring when a difference between the frequencies of electrical signals applied to the mode/frequency shifters 100 and 101 is 40 Hz. Referring to FIGS. 8a and 8b, it can be found that interferences in opposite directions maintain a phase difference of π in both cases of FIGS. 8a and 8b.

Fourth Embodiment

Comb Filter I Capable of Varying Wavelength Cycle

In the case of the interferometer of the third embodiment (FIG. 7), the optical paths of the LP01 and LP11 modes are more or less different because light passing through optical fibers associated with the optical paths exhibit different effective refraction indexes in accordance with the LP01 and LP11 modes even though the optical paths of the LP01 and LP11 modes have the same geometrical length. Accordingly, where the length $L\pi$ of each optical fiber is set in such a manner that the irreversible phase difference is $\pi$, it is impossible to vary the wavelength cycle of the comb filter because the cycle of the comb filter is fixed by the setting.

Figure 9:
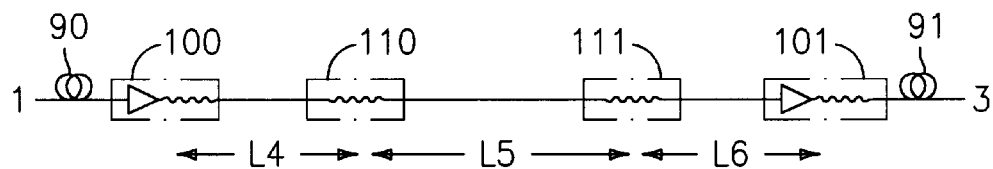
FIG. 9 is a view illustrating an embodiment of a comb filter capable of varying a wavelength cycle in accordance with the present invention.

In order to vary the cycle of the comb filter, as desired, while fixing the irreversible phase difference in the irreversible interferometer of the third embodiment, it is necessary to use a pair of passive mode couplers 110 and 111 shown in FIG. 9.

FIG. 9 illustrates a comb filter in which a pair of passive mode couplers 110 and 111 having a coupling rate of 100% are incorporated. The passive mode couplers 110 and 111 are arranged between a pair of mode/frequency shifters 100 and 101 constituting the irreversible interferometer of the third embodiment (FIG. 7). The length between the mode/frequency shifters 100 and 101, namely, the sum of lengths L4, L5 and L6 (L4+L5+L6), is identical to L3 (L3=L$\pi$). In this case, the wavelength dependency is determined by the ratio between the sum of the lengths L4 and L6 (L4+L6) and the length L5.

For example, the cycle of the wavelength filter is exhibited as shown in FIG. 7 when the length L5 is zero (L5=0). When the sum of the lengths L4 and L6 (L4+L6) is identical to the length L5, the comb filter has an infinite cycle, so that it has no wavelength dependency. Thus, it is possible to optionally adjust the cycle of the comb filter by appropriately adjusting the above-mentioned length ratio.

Fifth Embodiment

Comb Filter II Capable of Varying Wavelength Cycle

Figure 10:
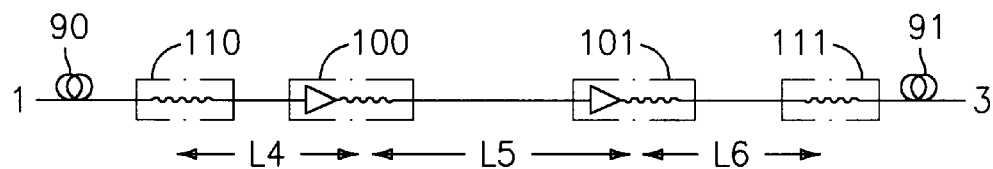
FIG. 10 is a view illustrating another embodiment of a comb filter capable of varying a wavelength cycle in accordance with the present invention.

Referring to FIG. 10, a wavelength cycle-variable comb filter according to another embodiment of the present invention is illustrated. As shown in FIG. 10, this comb filter has a configuration obtained by changing the relative positions of constituting elements in the comb filter configuration of the fourth embodiment (FIG. 9). That is, the relative positions of the passive mode coupler 110 and mode/frequency shifter 100 are changed from each other. Also, the relative positions of the passive mode coupler 111 and mode/frequency shifter 101 are changed from each other. In this case, the mode/frequency shifters 100 and 101 have a coupling rate of 100% whereas the passive mode couplers 110 and 111 have a coupling rate of 50%.

The length L5 between the mode/frequency shifters 100 and 101 corresponds to half the length $L\pi$ in the basic configuration. As in the fourth embodiment, the wavelength dependency in this embodiment is determined by the length ratio between "L4+L6" and "L5".

Where the device of either FIG. 9 or 10 is configured in such a manner that "L4+L6" corresponds to "L5" (L4+L6= L5), it is possible to eliminate the wavelength dependency while reducing the temperature dependency. Where optical fibers respectively associated with "L4+L6" and "L5" are wound together on a single cylinder so that they simultaneously sense a variation in temperature, it is possible to obtain a considerably stable optical output in spite of a variation in the surrounding temperature.

Typically, electrical signals required in the mode/frequency shifters 100 and 101 for a mode conversion have frequencies which are slightly different in accordance with two different polarized beams of light, respectively. For this reason, in this embodiment, an irreversible operation is carried out for one polarized beam whereas a transmissivity of 1 is always obtained for the other polarized beam irrespective of the advancing direction of the beam. In order to eliminate such a polarization dependency, electrical signals having two different frequencies are applied to each of the mode/frequency shifters 100 and 101. In this case, it is possible to mode-convert both the polarized beams. Thus, both the polarized beams can be independently controlled.

Sixth Embodiment

Figure 11:
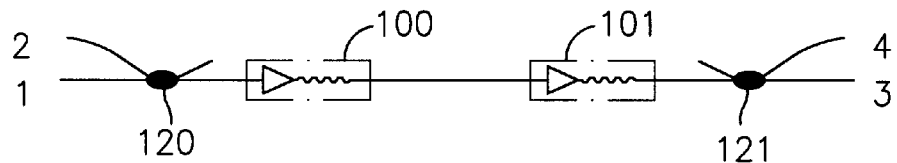
FIG. 11 is a view illustrating a configuration in which the irreversible interferometer of FIG. 7 is extended to a 2×2 structure.

Irreversible Interferometer Expanded to 2×2 Structure

Where the LP11 mode strippers 90 and 91 in the configuration of the third embodiment (FIG. 7) are replaced by mode filters 120 and 121 each adapted to allow a wave of a particular oscillation mode to selectively pass therethrough, respectively, the resultant light beam of the LP11 mode can be output at an additional port without its removal. In this configuration, ports 2 and 4 are provided in addition to ports 1 and 3, as shown in FIG. 11. This irreversible interferometer can be used as a circulator having four ports as in the case of FIG. 5.

Seventh Embodiment

Irreversible Resonator

Figure 12:
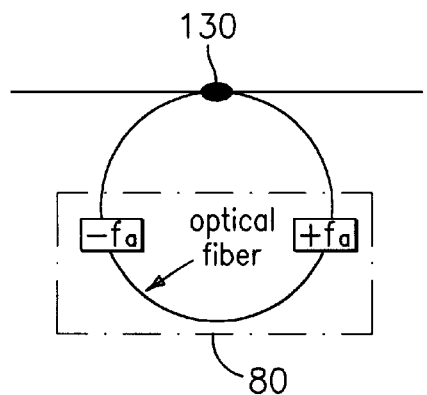
FIG. 12 is a view illustrating an irreversible resonator using an irreversible phase shifter according to the present invention.

A ring type irreversible resonator can be configured by connecting a directional coupler 130 to the irreversible phase shifter 80 of the first embodiment (FIG. 3) using an optical fiber, as shown in FIG. 12.

By such a configuration, light beams transmitting in opposite directions (namely, right and left directions) through the irreversible resonator have different wavelengths, respectively. Where a ring type laser is configured using the resonator, the positions of longitudinal modes in the laser in clockwise and counter-clockwise directions are exhibited at different frequencies, respectively.

It is also possible to configure an irreversible resonator by incorporating the irreversible interferometer of the second or third embodiment (FIGS. 5 or 7) in a ring type laser.

As apparent from the above description, the present invention provides an irreversible optical device using an optical frequency shift which can be operated for any wavelength while requiring no magneto-optic medium. This irreversible optical device also exhibits a small insertion loss. The irreversible optical device of the present invention can be used for a variety of purposes under the condition in which the system is stabilized using a simple feedback circuit. For instance, the irreversible optical device can be used as an optical isolator or a circulator.

Furthermore, the irreversible optical device of the present invention has new functions not provided in conventional irreversible optical devices. For example, where the irreversible optical device of the present invention is used as a frequency shifter, its operation can be modulated using an electrical signal. Accordingly, the device of the present invention has a feature capable of a phase shift or transmissivity modulation of light and a variation in the transmissivity of light depending on the wavelength of the light.

The irreversible optical device of the present invention may also be used as a comb filter having a transmissivity cycle depending on the wavelength of light passing therethrough. In this case, the transmitting wavelength of the light varies in accordance with the advancing direction of the light. The cycle of the wavelength filter can be optionally adjusted by modifying the configuration of the wavelength filter. Such an irreversible comb filter can be used as a WDM (Wavelength Division Mode) device for bidirectional communications.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An irreversible phase shifter comprising at least two optical frequency shifters arranged in series, wherein
each of the optical frequency shifters comprises a pair of first and second frequency shifters arranged between an optical path having a desired length, with a first one of the pair of frequency shifters being adapted to decrease the frequency of a light beam passing therethrough by a set frequency while a second frequency shifter of the pair being adapted to increase the frequency of a light beam passing therethrough by the set frequency.

2. The irreversible phase shifter in accordance with claim 1, wherein each of the first and second frequency shifters has an irreversible phase difference obtained by adjusting the frequency of an electric signal entering the respective frequency shifter or the length of the optical path.

3. The irreversible phase shifter in accordance with claim 1, wherein each of the first and second frequency shifters is adapted to shift phases of two light beams advancing oppositely through the respective frequency shifter while not varying an irreversible phase difference in the respective frequency shifter when the phase of a signal applied to the respective frequency shifter varies.

4. The irreversible phase shifter according to claim 1, wherein each said frequency shifter of said pair of first and second frequency shifters comprises:
a twin-mode optical fiber arranged for propagating a light beam;
a function generator for generating an electrical signal having a particular frequency;
a piezoelectric transistor coupled to said function generator for generating oscillations based upon an electrical signal generated by the function generator; and
a horn coupled to the function generator and arranged for amplifying weak oscillations generated from the piezoelectric transistor to a maximum and coupled to the twin-mode optical fiber such that oscillations are transferred to the twin-mode optical fiber through the horn.

5. An irreversible interferometer comprising: 4 2×2 ports adapted to be used as input or output ports;
a pair of beam splitters coupled to a respective pair of the 4 2×2 ports and adapted to split a light beam received therein, the beam splitters being connected to each other by a first optical path; and
an irreversible phase shifter arranged between the beam splitters, the irreversible phase shifter including a pair of frequency shifters and a second optical path arranged between the frequency shifters, the second optical path having a length capable of generating an irreversible phase difference of $\pi$.

6. The irreversible interferometer in accordance with claim 5, wherein the frequency shifters have a variable phase difference to shift the phase of a light beam passing through the second optical path, thereby varying the transmissivity in the irreversible interferometer.

7. The irreversible interferometer in accordance with claim 5, wherein the second optical path has a desired length so that the irreversible interferometer is used as an optical circulator.

8. The irreversible interferometer in accordance with claim 5, wherein only one port coupled to each said beam splitter is used such that the irreversible interferometer functions as an optical isolator.

9. The irreversible interferometer in accordance with claim 5, wherein the first and second optical paths have different lengths, respectively, so that the irreversible interferometer has a transmissivity varying in accordance with the wavelength of a light beam passing therethrough, thereby enabling it to be used as an irreversible comb filter.

10. An irreversible ring-type resonator, comprising:
a directional coupler; and
an irreversible interferometer according to claim 5, coupled to the directional coupler through an optical fiber.

11. The irreversible resonator according to claim 10, wherein each said frequency shifter of said pair of first and second frequency shifters comprises:
a twin-mode optical fiber arranged for propagating a light beam;
a function generator for generating an electrical signal having a particular frequency;
a piezoelectric transistor coupled to said function generator for generating oscillations based upon an electrical signal generated by the function generator; and
a horn coupled to the function generator and arranged for amplifying weak oscillations generated from the piezoelectric transistor to a maximum and coupled to the twin-mode optical fiber such that oscillations are transferred to the twin-mode optical fiber through the horn.

12. The irreversible interferometer according to claim 5, wherein each said frequency shifter of said pair of first and second frequency shifters comprises:
a twin-mode optical fiber arranged for propagating a light beam;
a function generator for generating an electrical signal having a particular frequency;
a piezoelectric transistor coupled to said function generator for generating oscillations based upon an electrical signal generated by the function generator; and
a horn coupled to the function generator and arranged for amplifying weak oscillations generated from the piezoelectric transistor to a maximum and coupled to the twin-mode optical fiber such that oscillations are transferred to the twin-mode optical fiber through the horn.

* * * * *